US008205218B1

(12) United States Patent
McCann et al.

(10) Patent No.: US 8,205,218 B1
(45) Date of Patent: Jun. 19, 2012

(54) DATA STORAGE SYSTEM HAVING COMMON SOFTWARE ENVIRONMENT

(75) Inventors: Peter J. McCann, Mason, NH (US); Christopher M. Gould, Leominster, MA (US); Jeffrey A. Brown, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1299 days.

(21) Appl. No.: 11/824,433

(22) Filed: Jun. 29, 2007

(51) Int. Cl.
*G06F 13/00* (2006.01)
*G06F 17/30* (2006.01)

(52) U.S. Cl. ........ 719/328; 707/705; 707/821; 711/111; 719/321

(58) Field of Classification Search .................. 707/705, 707/821; 711/111; 719/321, 328
See application file for complete search history.

(56) References Cited

U.S. PATENT DOCUMENTS

| | | | |
|---|---|---|---|
| 6,948,001 B1 * | 9/2005 | Bradley | 709/246 |
| 6,961,740 B2 * | 11/2005 | O'Connor et al. | 1/1 |
| 7,451,456 B2 * | 11/2008 | Andjelic | 719/321 |
| 7,512,744 B2 * | 3/2009 | Banga et al. | 711/147 |
| 7,603,484 B2 * | 10/2009 | Dai et al. | 710/5 |
| 7,930,684 B2 * | 4/2011 | Roeck et al. | 717/129 |
| 2005/0086349 A1 * | 4/2005 | Subramaniyan | 709/230 |
| 2006/0075119 A1 * | 4/2006 | Hussain et al. | 709/227 |

* cited by examiner

*Primary Examiner* — Charles E Anya
(74) *Attorney, Agent, or Firm* — Krishnendu Gupta; Jason A. Reyes; John T. Hurley

(57) ABSTRACT

Described are techniques for facilitating communication between code modules. A first code module is provided that makes at least one call using an application programming interface. The application programming interface facilitates communication between the first code module and a target code module and provides support for performing the at least one call from a first execution mode associated with the first code module and a second execution mode associated with the target code module. The application programming interface provides support for user space to user space communication, user space to kernel space communication, kernel space to kernel space communication, and kernel to user space communication. The first execution mode of the first code module and said second execution mode of the target code module are determined. A communication path is established between the code modules in accordance with the first and second execution modes.

15 Claims, 15 Drawing Sheets

DATA STORAGE SYSTEM HAVING COMMON SOFTWARE ENVIRONMENT

BACKGROUND

1. Technical Field

This application generally relates to data storage, and more particularly to techniques used for data storage configuration.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

A data storage system environment may consist of a wide variety of different hardware and software. For example, a data storage system may use a variety of different operating systems, hardware platforms, file systems, and the like. Problems may arise in connection with development of new code modules as well as for existing code modules intended for execution on data storage systems in order for the code modules to be usable in the different environments.

Thus, it may be desirable to utilize a flexible architecture and framework which allows a same code module to be used in the variety of different data storage system environments.

SUMMARY OF THE INVENTION

In accordance with one aspect of the invention is a computer-implemented method for facilitating communication between code modules comprising: providing a first code module making at least one call using an application programming interface, the application programming interface facilitating communication between the first code module and a target code module wherein the application programming interface provides support for performing the at least one call from a first execution mode associated with the first code module and a second execution mode associated with the target code module, said application programming interface providing support for user space to user space communication, user space to kernel space communication, kernel space to kernel space communication, and kernel to user space communication; determining, by code of the application programming interface, said first execution mode of the first code module and said second execution mode of the target code module, wherein said first execution mode and said second execution mode are one of a user execution mode or a kernel execution mode; and establishing, using code of the application programming interface, a communication path between said first code module and said target code module in accordance with said first execution mode and said second execution mode. If the first execution mode and second execution mode differ, the code of the application programming interface may communicate with a helper module to perform said establishing. If the first execution mode is user execution mode and said second execution mode is kernel execution mode, the code of the application programming interface may communicate with a helper module executing in said kernel execution mode to establish the communication path. If the first execution mode is kernel execution mode and said second execution mode is user execution mode, the code of the application programming interface may communicate with a helper module executing in said user execution mode to establish the communication path. When the first code module is executing in user execution mode and makes a first call using the application programming interface, a first portion of code of the application programming interface for implementing the first call may perform processing to emulate kernel execution mode functionality to provide functionality of said first call for code executing in the user execution mode. The first code module may be executing in kernel execution mode and may make a first call using the application programming interface to perform an operation using code included in said target module executing in said user execution mode. The first code module may be executing in user execution mode and may make a first call using the application programming interface to perform an operation using code included in said target module executing in said kernel execution mode. The user execution mode may be an unprivileged execution mode and said kernel execution mode may be a privileged execution mode. The application programming interface may provide support for performing said at least one call on a plurality of different operating systems and code of said application programming interface may utilize at least one operating system primitive operation in accordance with which one of said plurality of operating systems is included in an environment of said first code module. The application programming interface may provide support for performing said at least one call on a plurality of different hardware platforms. The method may include communicating to said helper module a name associated with said target code module; and performing, by said helper module, processing to communicate with said target code module. The communication path may be directly between said first code module and said target code module and said first code module may communicate directly with said target code module to perform a requested operation. The communication path from said first code module and said target code module may include said helper module. The method may also include communicating to said helper module a name associated with said target code module; and performing, by said helper module, processing to communicate with said target code module. The communication path may be directly between said first code module and said target code module and said first code module may communicate directly with said target code module to perform a requested operation. The communication path from said first code module and said target code module may include said helper module. Each code module executing in user execution mode may have its own process address space and may be a separate fault container so that if a fault occurs when executing said each code module, other code modules executing in said user execution mode having their own process address spaces may continue executing.

In accordance with another aspect of the invention is a data storage system comprising executable code stored on a computer readable medium for facilitating communication between code modules, the computer readable medium comprising code for: providing a first code module making at least one call using an application programming interface, the application programming interface facilitating communication between the first code module and a target code module wherein the application programming interface provides support for performing the at least one call from a first execution mode associated with the first code module and a second execution mode associated with the target code module, said application programming interface providing support for user space to user space communication, user space to kernel space communication, kernel space to kernel space communication, and kernel to user space communication; determining, by code of the application programming interface, said first execution mode of the first code module and said second execution mode of the target code module, wherein said first execution mode and said second execution mode are one of a user execution mode or a kernel execution mode; and establishing, using code of the application programming interface, a communication path between said first code module and said target code module in accordance with said first execution mode and said second execution mode. If the first execution mode and second execution mode differ, the code of the application programming interface may communicate with a helper module to perform said establishing. The data storage system may include multiple instances of a same process. Each of the multiple instances may execute in said user execution mode and have a separate user process address space. In response to a fault occurring during execution of a first of said multiple instances, a second of said multiple instances may handle processing performed by said first instance.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
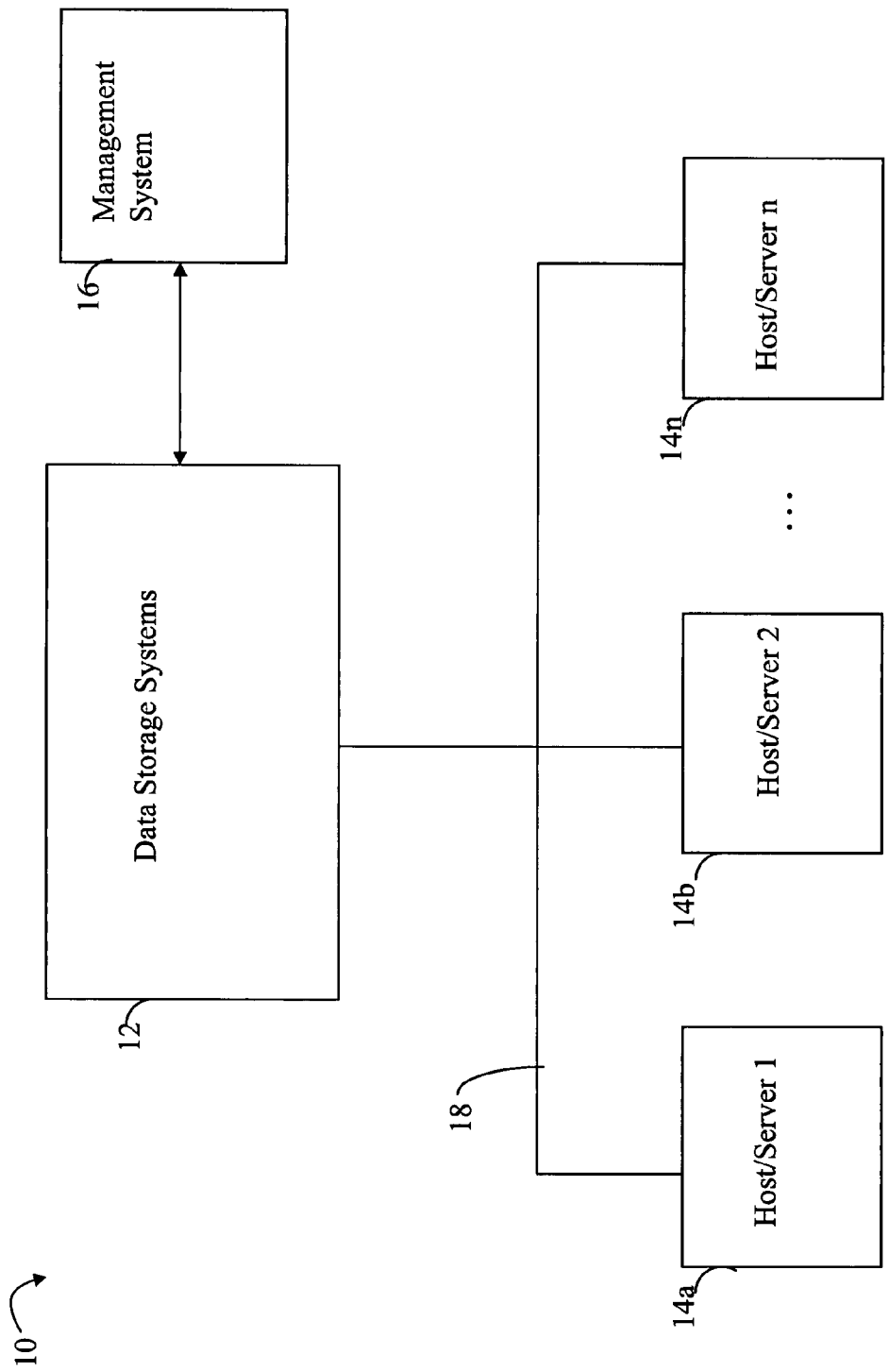
FIG. 1 is an example of an embodiment of a computer system that may utilize the techniques described herein.

With the growing popularity of all types of data storage devices, there is also a growing demand for software and features for data storage devices. However, developing software components for the devices is a difficult task because storage devices operate under constraints which at least in some cases are distinct or prioritized differently from those imposed on other types of computing systems.

For example, data storage devices require solutions to different sets of problems. A wide variety of data storage hardware solutions are available in the market. The solutions require significant efforts from software developers to provide high performance and reliability and other desired storage features and to integrate them with software solutions that would present to the end-customers easy and friendly user-interfaces. In addition, providers of hardware solutions are challenged to provide reasonable hardware-to-software interface mechanisms.

In many cases these constraints have resulted in providing largely static and non-expandable programming environments for data storage devices. The programming environments for these devices also tend to lack a common or standard interface to handle the integration of software components in a data storage environment. Thus, the creation of component-oriented software is rendered difficult and becomes a custom solution. Accordingly, conventional programming and testing environments for such devices present a substantial obstacle to software developers for such devices. Adding functionality to the operating system of a storage device can be difficult. Adding the same functionality to a storage device having a different operating system may require in general not only a different set of function calls and programming methods, but a different programming environment altogether.

Examples of conventional methods providing platform independence include the CORBA architecture and Sun Microsystems' Java. A CORBA architecture employs a middle layer called Object Request Broker ("ORB") to facilitate integration of software objects. The middle layer requires memory and a CPU's processing power.

A conventional Java architecture employs a virtual machine which provides platform independence at run-time. A virtual machine facilitates different object components to find each other, and the object components interact with each other via the virtual machine. Because object components interact and execute via the virtual machine versus execution of native code of the underlying processor, the processing speed is noticeably slowed down in a Java architecture. In addition, the virtual machine requires a large amount of memory and only executes code in user space. Furthermore, a software developer is required to use the Java language, and thus needs to expend a large amount of time and effort to become versatile in using a Java system. In addition, a large amount of legacy code written in non-Java language becomes unavailable in a Java architecture.

It is desirable to have flexible and platform independent programming environments for storage devices, especially given the growing demand for storage devices having a variety of different data storage system environments.

As described at least in part below, a storage software platform architecture can be provided that converges and leverages existing platform capabilities and technologies with other assets to provide a sustainable advantage.

In at least some implementations the architecture allows developers to focus on the customer experience and quality, improved product scalability, reliability, and availability, innovation in response to customer need, development of best of breed products and solutions, product line breadth, and enterprise and data center technologies. In at least some implementations the architecture also facilitates development and/or improvement in key areas such as convergence and leverage, ease of use, channel readiness, consistency and flexibility, application awareness, storage solutions and services, success at the lower end of the market, and efficiency, productivity, and focus of development resources.

In at least one aspect, the architecture is or includes a scalable, common architecture that can be extended across many technical and industry dimensions, and that takes into account that performance considerations vary, that availability and quality concerns may be high but have different complexities, that security is constant (but with perimeter versus internal security priorities varying), and that many different topologies exist. In at least one implementation, the architecture is or includes a unified architecture for integrated management of network attached storage (NAS), and object and storage block services.

The architecture may include features such as openness, application awareness, ease of use and management, partner enablement, scaling, globalization, enhanced platform architecture, and enhanced availability and reliability. Openness may rely on and/or leverage proprietary and third party technologies for accessibility and user interface. Application awareness may include automated discovery, application provisioning, and self-management. Ease of use and management may include a unified user experience, total lifecycle coverage, self-management, and active communities. Partner enablement may include features that facilitate sales channels and OEM arrangements. Scaling may include a range from small and medium size businesses to enterprise, and may include scaling up and scaling out. Globalization may include fully internationalized systems, with localized user interface screens and behavior. Enhanced platform architecture may include modular building blocks and well defined interfaces. Enhanced availability and reliability may include fault domains and autonomous management.

At least one implementation of the architecture takes into account that, from a high level perspective, many different storage platforms have many of the same features, such as moving data from one I/O chip to memory to another I/O chip, high availability, clustering, peer to peer replication, and drive management, and such platforms also support similar interface protocols, transformations, and methods. However, if such platforms have significantly varying implementations and external interfaces, and little commonality, development involves significant duplication of functionality and work, and it can be difficult to move technology or techniques from platform to platform, share or reuse technology or techniques, combine technology or techniques from different platforms together or with new applications, or otherwise avoid doing the same work multiple times. For example, if a new feature or new standard is needed, the new feature or standard must be implemented separately for each platform.

A convergence-oriented common software environment based on the architecture takes into account different base architectural assumptions, different terminology for similar concepts, different behaviors or expressions for similar features, different high availability, different clustering, scaling, and non destructive upgrade models, different wire protocols (e.g., replication, mainframe), and different management interfaces and look-and-feel interfaces. As a result, the environment takes into account different software environments, different base operating systems dictating hardware, and different hardware dictating base operating systems.

Thus, the common software environment enables mechanical commonality as a prelude to enabling architectural commonality, with the results that the value of developed technology increases, commonality increases, it takes less work to maintain the same base of functions or add features, flexibility increases, the ability to effect rapid change is improved, technology and techniques are freed from existing mechanical then architectural constraints, the ability to combine existing technology and techniques with new technology and techniques in new ways increases, lost opportunity costs are regained, resources are freed up to refractor and rationalize rather than rewrite or discard current technology or techniques, the underlying basics of technology is preserved, enabling virtualization, code is strengthened by preserving field experience, development, testing, and support are made more efficient, and reliability is improved.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with techniques described in following paragraphs which are part of a common software environment.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for the common software environment.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

The common software environment may include components described herein executing on each data storage system. Each of the data storage systems may have any one of a variety of different hardware and software platforms. For example, a first data storage system may include the common software environment with a first operating system and underlying hardware. A second data storage system may include the common software environment with a different operating system and different underlying hardware.

The common software environment includes a framework which may be implemented using APIs (application programming interface) and other code modules described herein. The APIs may implement the underlying functionality which varies with the different possible data storage system hardware and software platforms. As such, code may be written using the APIs so that the code is insulated from the underlying platform dependencies. The code may be executed on any data storage system utilizing the APIs regardless of the particular hardware and/or software platform of the data storage system. Additionally, the API may be written so that the code is allowed to execute in user space or kernel space as will be described in more detail herein. As such, the API may utilize the underlying primitives of the particular operating system or may also emulate functionality on an operating system lacking a particular feature. A code module using the API can also execute in user mode or kernel mode on a supported operating system. For example, a code module may make a first API call on a data storage system having a first operating system. For the first operating system, the API may implement the first API call utilizing the underlying primitives of the first operating system. The code module may also be executed on another data storage system having a second different operating system. For the second operating system, the first API call may be implemented using the primitives of the second operating system. The second operating system may not have a rich or full set of primitives so the API may emulate the necessary functionality of the primitives missing from the second operating system. The API uses the underlying operating system primitives where available and may otherwise synthesize or emulate the functionality necessary as may vary with the capabilities of each operating system. The code module may also execute in user or kernel mode on the first and second operating systems.

Figure 2:
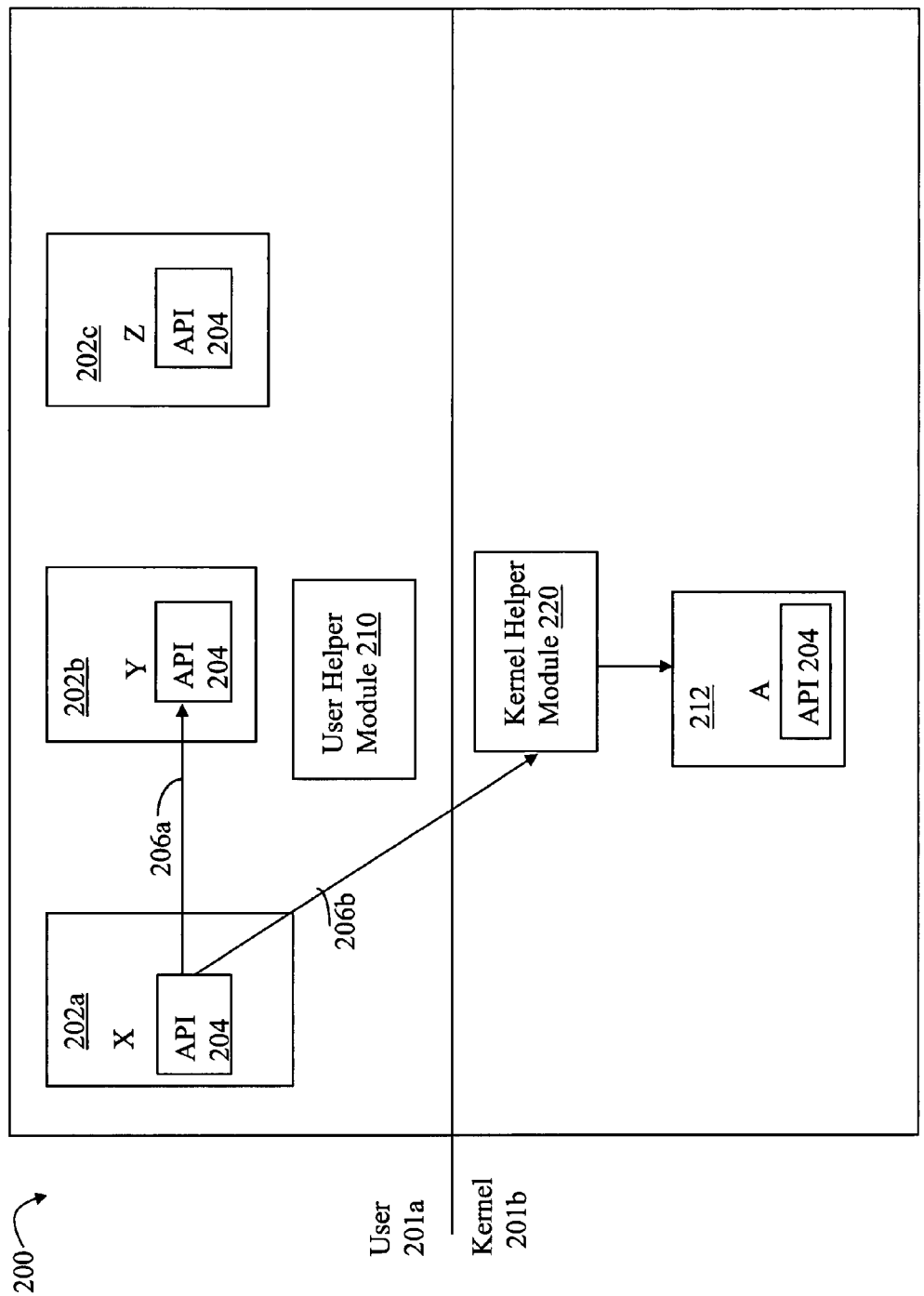
FIG. 2 is an example illustrating use of the kernel mode helper module in facilitating communications between user and kernel space.

Referring to FIG. 2, shown is an example of components that may be executing on a processor node of a data storage system. If a data storage system has multiple processors, FIG. 2 illustrates components that may be executed by each such processor.

In the example 200, shown are user mode or user space 201a and kernel mode or kernel space 201b with different entities executing in each mode. As known in the art, code executing in the kernel mode may be characterized as a privileged execution mode with unrestricted access to system memory and hardware devices. Operating system code typically executes in kernel mode. In contrast, code executing in user mode may be characterized as a non-privileged mode of execution with restricted access to the system memory and hardware devices. In the example 200, elements 202a, 202b, 202c, and 210 may be user space processes or containers each having their own process address space. Thus, each user space process may be characterized as a single container or fault domain for fault containment purposes. In other words, each user process has its own state and can have an execution fault independent of, or isolated from, the other user processes. Thus, when one of the user processes experiences a fault, the other user processes may continue to execute without being affected by the fault. When a first of the executing processes is notified of the failing process by the kernel helper or other notification means, the first process may also notify other executing user and/or kernel space modules. The first process, or other currently executing user space process, may perform processing on behalf of the failing process and may perform cleanup associated with the failing process. In one embodiment, each user process can save information about its own state in an area of memory external to the process so that another instance of the same user process can perform cleanup, resume processing of the failed process, and the like. Additionally, a currently executing user space process may take steps in response to the failing process in accordance with any outstanding requests or processing being performed by the failing process on behalf of the currently executing process. For example, a first process may reissue its request previously made to a failing user process to another user process instance performing the same services or functionality as the failing process. In contrast, all code executing in the kernel mode may execute in the context of the same address space so that if a fault occurs during execution of a kernel mode process or thread, the operating system may experience a failure. Thus, all the code executing in kernel mode 201b may be characterized as a single kernel fault domain or container in contrast to each instance of 202a, 202b, and 202c executing in user mode 201a. Typically, code such as device drivers execute in kernel mode. As will be described in following paragraphs using the common software environment herein, a device driver using APIs which implement user and kernel mode variations of necessary operations can execute in both user and kernel mode without modification to the original source code. In other words, for a given API call, any coding difference in implementing the API call when executing in user or kernel mode, different operating system, or other data storage system environment particular, may be embedded in the code of the API.

In the example 200, each of the user mode processes 202a, 202b and 202c may use the same API 204. Code executing in the kernel space, such as software component or module 212, may also utilize the same API 204. The underlying details of implementing the functionality of the API call are embedded in the API code and not the code associated with 202a-202c and 212. Using the API, an embodiment may make a same set of functionality available to code that executes in both user and kernel space and leaves the implementation details of the API calls to be included in the API code. The API may provide services to kernel space code which are implemented using, and may be otherwise only available to, code executing in user space. Similarly, the API may provide services to user space code which are implemented using, and may be otherwise only available to, code executing in kernel space.

To facilitate communications between code executing in user mode and code executing in kernel mode, user helper module 210 and kernel helper module 220 may be used in combination with the API. In one embodiment, module 210 may maintain a list of the currently active containers or processes in user space along with the services performed by each. Similarly, module 212 may maintain a list of the software components executing in kernel mode and the services performed by each. Process 202a may make a call using the API 204 for a service or to access a data structure available using code executing in kernel mode. For example, a user space process 202a may allocate physical memory and may utilize API 204 for this allocation request. The API 204 may determine that this functionality is performed by code executing in kernel mode and may communicate with the kernel helper module 220 as illustrated by 206b. The kernel helper module 220 then contacts the appropriate code in kernel space, such as 212, to perform the requested operation. Any return information from the requested operation, such as an output parameter, may be returned to process 202a using the same communication path through which the requested operation was initiated. Alternatively, the module 220 may be used to facilitate establishing a communication path directly from the calling module 202a and the called target module 212. Communications may then occur directly between 202a and 212 rather than through the helper module 220. The kernel helper module 220 may be characterized as a proxy module for processes executing in user space. The API has code included therein which determines whether the requested operation is done by calling code executing in user mode or kernel mode. If the API code determines that the requested operation is to be done in kernel mode, the helper module 220 is invoked as just described. Otherwise, the code of the API performs a call to the appropriate module executing in user mode such as, for example, illustrated by 206a.

As a variation to the foregoing, a user process may have knowledge about the user or kernel space code which performs a particular service, is responsible for maintaining a particular data structure, and the like. For example, the name of the user space or kernel space code (e.g., module name) to be invoked may be coded in the module of the calling user space process, passed as a parameter, and the like. As such, the invoking user space process such as 202a performs an API call and may pass as a parameter the name of the module to be invoked. The API may determine whether the name of the module to be invoked resides in user or kernel space. If the module being invoked resides in user space, the API establishes a communication path from the initiator or calling user process to the code module being invoked. From there, the calling user process and the called user process may communicate directly to perform the requested service of the calling user process. If the module being invoked resides in kernel space, the API communicates with the kernel helper module 220 to establish a communication path from the initiator or calling process in user space and the called code module in kernel space. From there, the calling user process and the called kernel space code module may communicate directly to perform the requested service. In the latter embodiment or variation, the initiator has knowledge regarding which module to call and the services performed by the called modules but uses the kernel helper module where appropriate to establish a communication path between the initiator and the called module. This is in contrast to having the initiator request a particular service, data structure, and the like, and utilizing the API and kernel helper module to determine the correct module to invoke.

Figure 3:
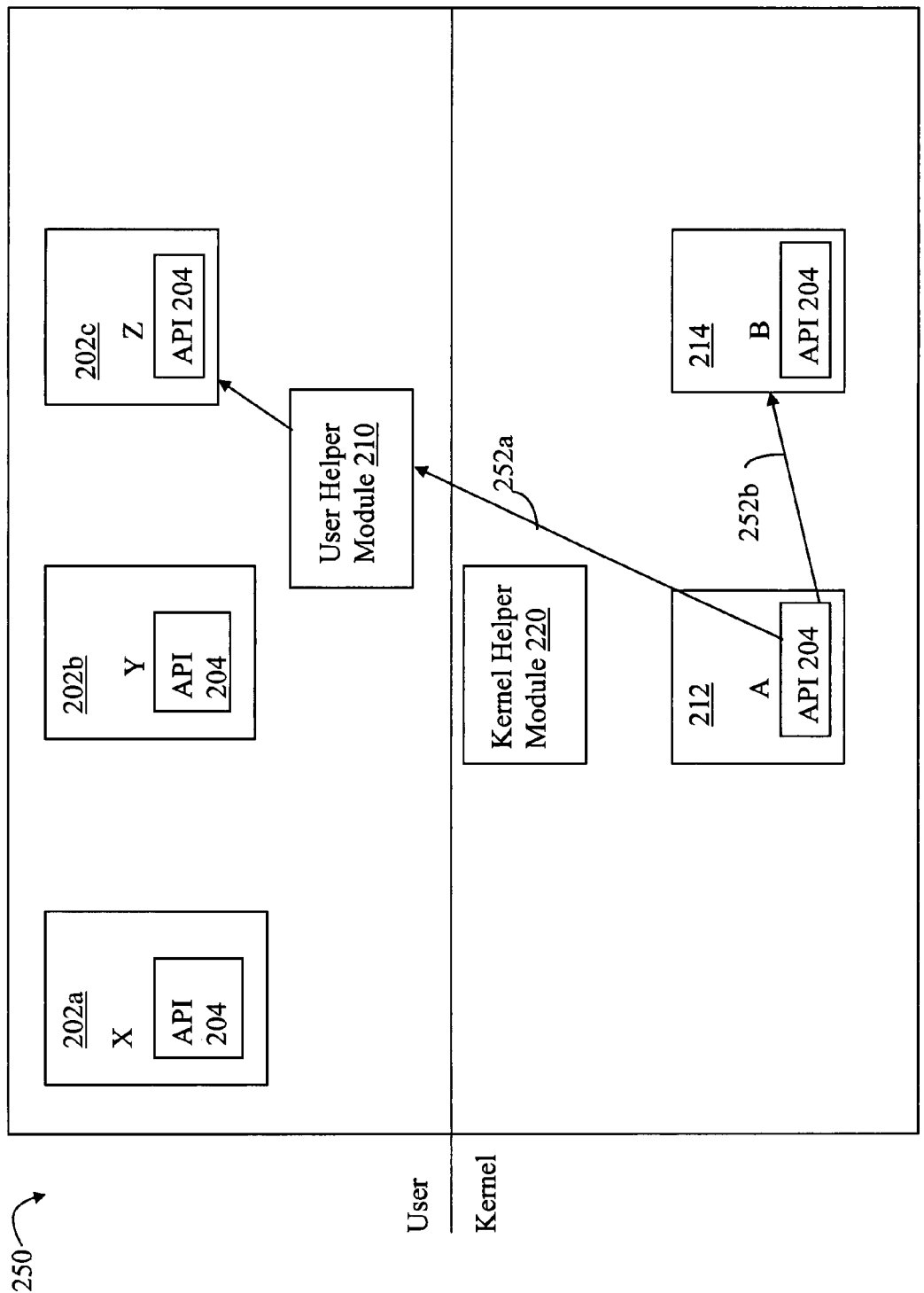
FIG. 3 is an example illustrating use of the user mode helper module in facilitating communications between kernel and user space.

Referring to FIG. 3, shown is an example illustrating how the user helper module facilitates processing of kernel mode requests. In a manner similar to as described in connection with FIG. 2, the user helper module 210 may be characterized as a proxy module for code executing in kernel space. As an example to illustrate, the API 204 may include a call to load a module. The code to load a module may be included in user space process 202c. Kernel code 212 may use the API 204 to make a call to load a library. Code implementing the API call may make a determination as to whether the requested operation is performed by code executing in kernel mode or user mode. With respect to module 202a, if the API determines that the call is performed by invoking code executing in user space, the API 204 of 212 contacts the user helper module 210 as illustrated by 252a. In turn, the module 210 examines its registry of user processes to determine the appropriate user process to contact. In this example, the module 210 determines that user process 202c performs the requested function and issues the request to 202c to perform the requested operation. Any return information, such as an output parameter, may be communicated to 212 using the same communication path through the user helper module 210 which initiated the request. Alternatively, the module 210 may be used to facilitate establishing a communication path directly from the calling module 212 and the called target module 202c. Communications may then occur directly between 212 and 202c rather than through the helper module 210. The API has code included therein which determines whether the requested operation is done by calling code executing in user mode or kernel mode. With respect to element 212 executing in kernel mode, if the API code determines that the requested operation is to be done in user mode, the helper module 210 is invoked as just described. Otherwise, the code of the API performs a call to the appropriate component 214 executing in kernel mode such as, for example, illustrated by 252b.

As a variation to the foregoing, kernel space code may have knowledge about the user or kernel space code which performs a particular service, is responsible for maintaining a particular data structure, and the like. For example, the name of the user space or kernel space code (e.g., module name) to be invoked may be coded in the module of the calling kernel space code, passed as a parameter, and the like. As such, the invoking kernel space code, such as 212, performs an API call and may pass as a parameter the name of the module to be invoked. The API may determine whether the name of the module to be invoked resides in user or kernel space. If the module being invoked resides in kernel space, the API establishes a communication path from the initiator or calling kernel space code module to the other kernel code module being invoked. From there, the calling kernel code module and the called kernel code module may communicate directly to perform the requested service. If the module being invoked resides in user space, the API communicates with the user helper module 210 to establish a communication path from the initiator or calling code module in kernel space to the called code module in user space. From there, the calling kernel code module and the called user space code module may communicate directly to perform the requested service. Thus, in this latter variation, the user helper module 210 helps to establish a communication path between the initiator kernel code module and the called user code module so that the foregoing two modules can communicate directly to perform the requested service of the initiator. In the latter embodiment, the initiator has knowledge regarding which module to call and the services performed by the called modules but uses the user helper module where appropriate to establish a communication path between the initiator and the called module. This is in contrast to having the initiator request a particular service, data structure, and the like, and utilizing the API and user helper module to determine the correct module to invoke.

In connection with the foregoing, an embodiment may execute multiple instances of the same user space container on the same data storage system processor. If a first instance of the user space container experiences a fault or other failure, another instance of the same user space container may be started using previously saved state information from the failing container. A process may save its own context or state information in memory or a file as it executes. As such, processing can be resumed from the point of failure by the another instance of the same container using the saved state information. The saved state information may vary with the code executed and may include, for example, information about a request from another module being serviced by the executing code. Additionally, the same instance of the user space container can be restarted and resume processing from the point of failure. This, combined with the ability to execute a same code module in user or kernel mode, provides a flexible framework affording many different uses and advantages. For example, a device driver or other code module typically executed in kernel mode may alternatively be executed in user mode with the ability to have multiple instances for use on failure as described. As another example, during development of code that will execute in kernel mode, the code modules may be developed and executed in the user mode to facilitate debugging. At a later point once debugging is complete, the code may be executed in kernel mode unmodified.

As described above, the common software environment may include the API and other code modules to implement the framework providing the user-kernel portability as well as portability among different hardware and software platforms (e.g., different operating systems, data storage systems and underlying hardware, and the like). The common software environment may include other code provided as a layer between the API and operating system specific code, for example, to facilitate communications with devices.

As described above, the same API may be used by a code module when the code module is executed in user space, kernel space, on different data storage systems having different environments such as different operating system and/or processor architecture. The code module may make API calls so that the API implements the same set of API calls to facilitate user space to kernel space, user space to user space, kernel space to kernel space, and kernel space to user space communications as appropriate depending on the execution mode of the calling or invoking code and that of the target or called code. The API handles the appropriate communication between the calling and called code modules. As described above, if the calling and called code modules are in two different modes (e.g., one in user mode and one in kernel mode), then the API utilizes the appropriate helper module to facilitate communications between the calling and called code modules. Thus, a module coded using the API as described herein may be executed in user mode or kernel mode unmodified. Furthermore, the same module may be executed on different data storage systems having different data storage system environments provided the particular data storage system environment is supported by the API. Thus, processing dependencies that may vary with user or kernel mode as well as operating system and underlying processor architecture may be handled by the API code so that a module utilizing the API as described herein may be executed in a variety of different data storage system environments as well as user or kernel mode.

What will now be described is an example illustrating how the techniques herein may be used in connection with a device driver so that the device driver can execute in user mode or kernel mode. In some instances, it may be desirable to execute a driver is user mode, for example, if the driver does not need to be shared among multiple processes. Otherwise, it may be more desirable to have the driver execute in kernel mode because sharing may be implemented more efficiently using code executing in kernel mode than user mode. Also, by executing code in user mode, multiple instances of the device driver can be available as described above so that if a first instance of the driver fails, a second instance may be used to resume executing from point of failure. The second instance may also be used in connection with processing other requests directed to the device driver. Also, there may be multiple storage processors (SPs) and each SP may execute an instance of a device driver for servicing requests.

Following paragraphs and figures describe use of the techniques herein with the device driver executing in kernel mode and the device driver executing in user mode.

Figure 4:
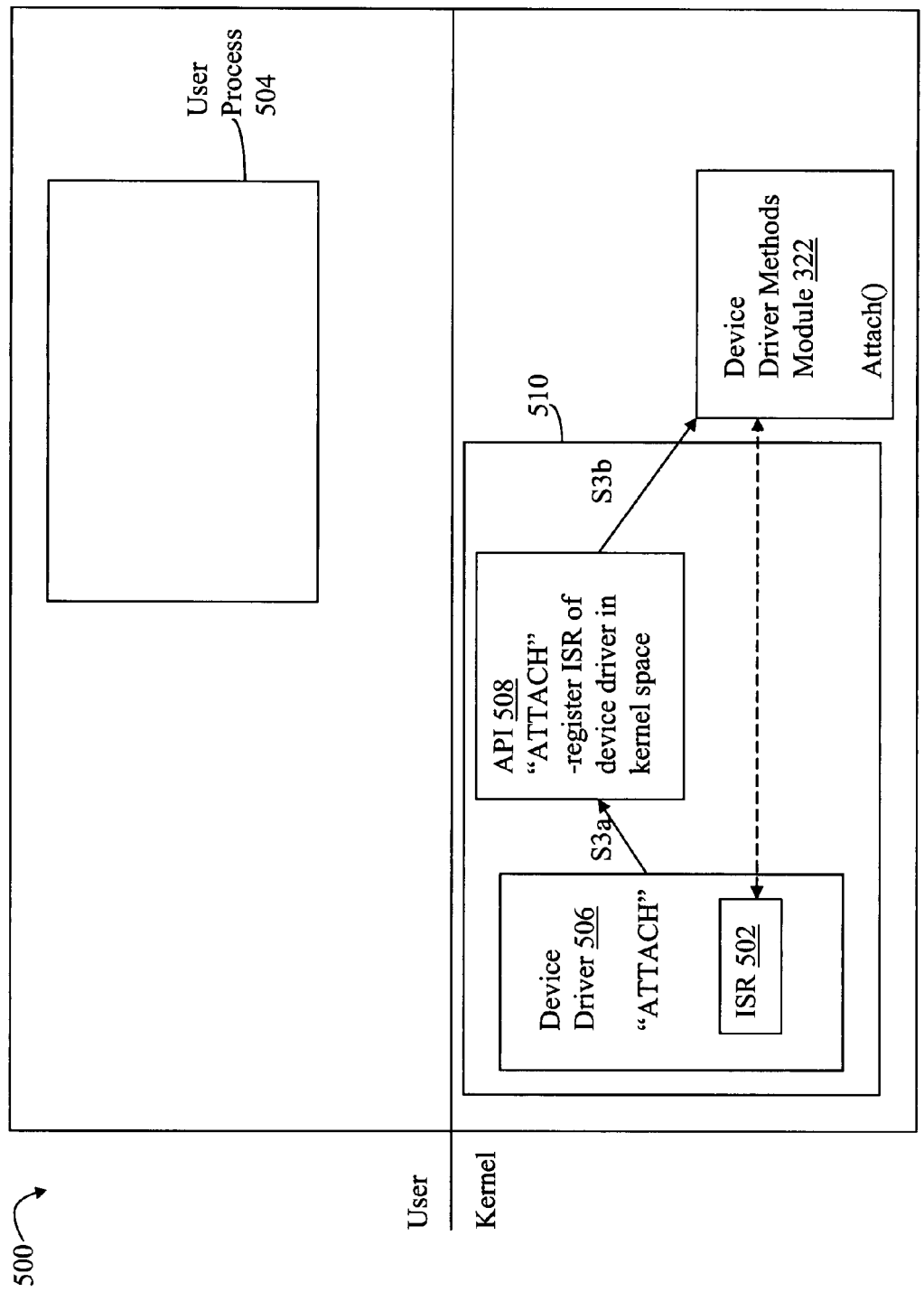
FIGS. 4-5 illustrate an example of a kernel space device driver.

Referring to FIG. 4, shown is an example illustrating registering or attaching a device driver in kernel mode. Attaching may be characterized as the process in which registers an ISR (interrupt service routine). Once registered, the ISR is invoked by the operating system to service any subsequent interrupts for the device.

In connection with the techniques herein, at system startup, the device driver methods module 322 is registered as the owner of those devices which are going to be used by the API. The module 322 may be characterized as code that is part of the common software environment which is layered on top of the underlying operating system software that communicates with the devices. The module 322 interfaces with the API to communicate with the devices.

Executing in kernel mode, the device driver 506 of module 510 may issue an API call as illustrated by S3a to attach the device driver to a device. The attach API call 508 results in API code determining whether to communicate with the user mode helper module to perform the requested attach call. In this instance, the API code determines that the requested attach operation is performed as illustrated by S3b by communicating with the module 322 to perform the attach operation in kernel mode. The module 322 invokes the operating system primitive to attach the ISR 502 so that the ISR 502 is invoked for servicing any faults or interrupts for the device. The attach results in the hardware table of interrupt vectors being updated to indicate that ISR 502 is invoked for servicing any subsequent interrupts for the device.

It should be noted that in accordance with the techniques herein, the code of module 510 including the ISR 502 may be implemented using a same API as will be used by the driver when executed in user mode as described below.

Figure 5:
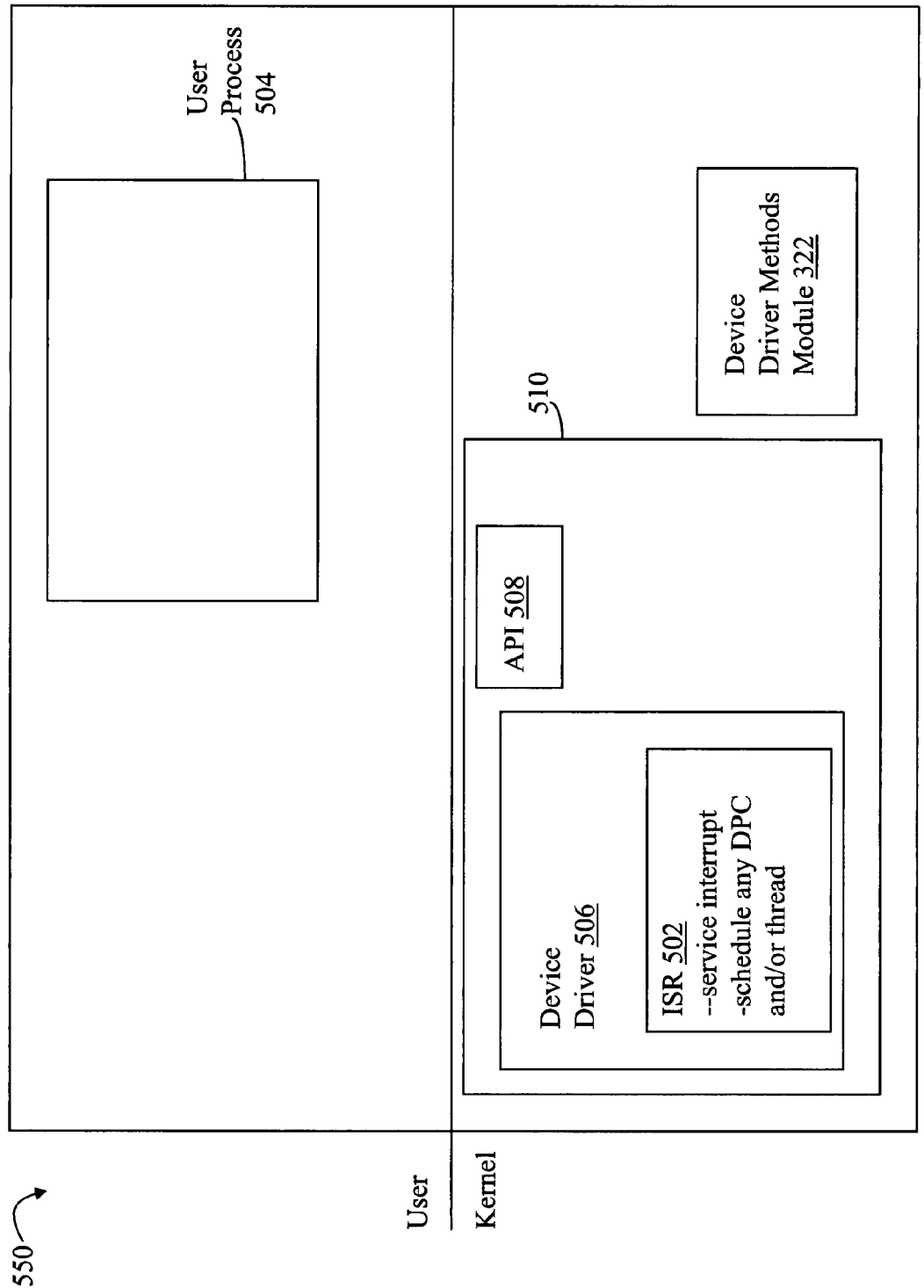

Referring now to FIG. 5, shown is an example illustrating processing when an interrupt occurs for the attached kernel mode device driver from FIG. 4. Upon the occurrence of an interrupt, the ISR 502 code is invoked to service the interrupt. As known in the art, interrupts may occur for a variety of reasons. For example, if the driver is controlling the device, the device may interrupt when a requested operation has been completed resulting in invocation of the ISR for servicing the device. Servicing the interrupt may include, for example, setting appropriate device registers to acknowledge the interrupt and queuing a deferred procedure call (DPC) to perform processing to complete the work of the signaled interrupt, or queue a DPC to schedule a thread which performs processing to service the interrupt. The DPC call within the ISR 502 code may be an API call "DPC" which implements the DPC. The API may implement the DPC by making the appropriate calls into code in kernel mode. The DPC may be characterized as a scheduled kernel mode callback which is performed at a later time. The DPC may be performed at a higher priority than other scheduled entities and is executed after any higher priority tasks.

The ISR 502 is coded using API calls to implement the DPC operation so that the same ISR code 502 may be ported for execution in user mode with the API handling the necessary processing to implement the DPC functionality.

Figure 6:
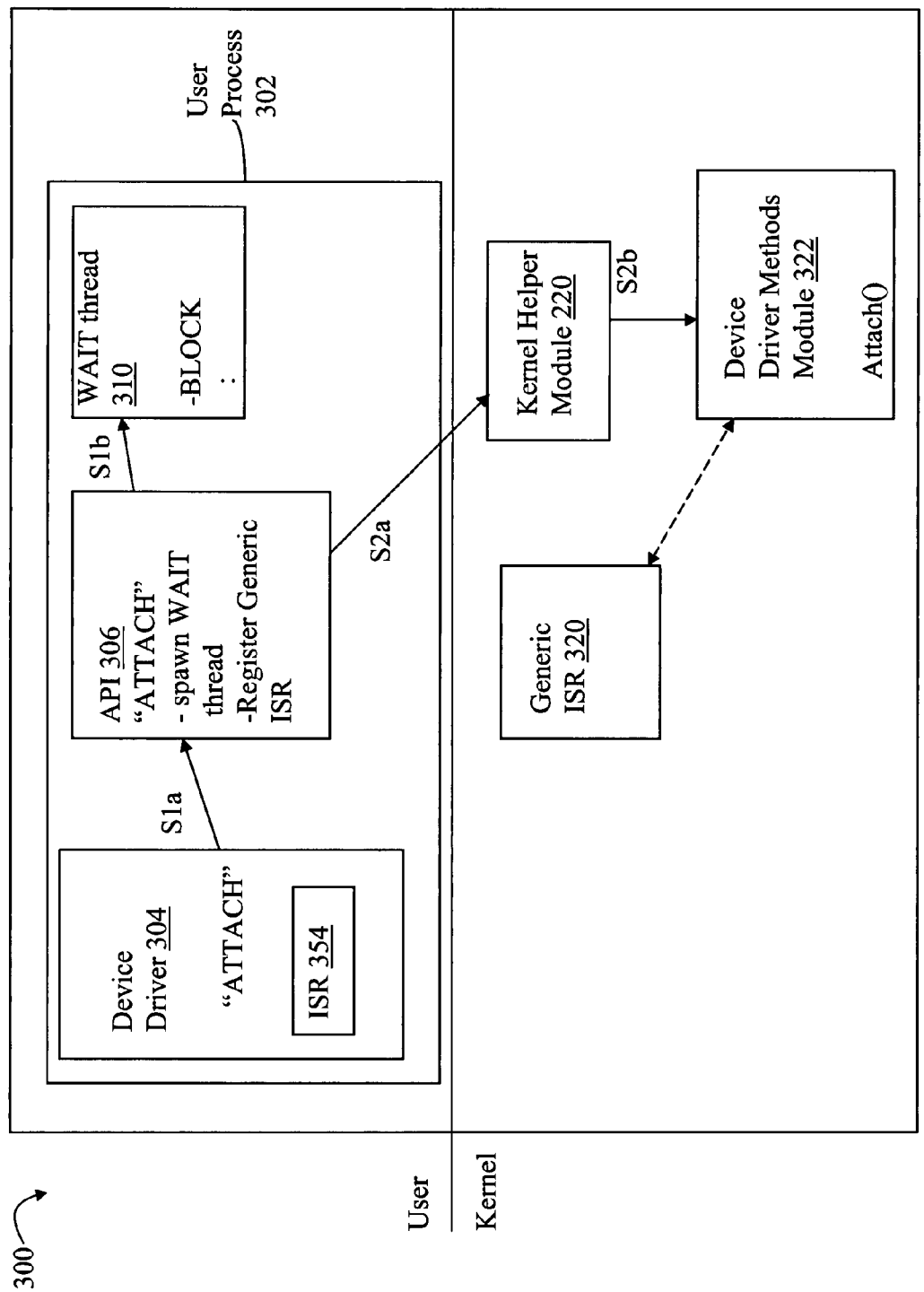
FIGS. 6-7 illustrate an example of a user space device driver.

Referring now to FIG. 6, shown is an example of the techniques herein used in connection with performing an attach operation to register the device driver in user mode rather than kernel mode as illustrated in FIG. 4. The example 300 illustrates the user mode device driver 304 executing an attach API call resulting in invoking API code 306 as illustrated by S1a. In this instance, the API code determines that the requested attach operation is performed as illustrated by S3b by first spawning wait thread 310 illustrated by S1b. The wait thread 310 includes code which executes an API call to block or stop execution of the thread 310 until signaled to resume execution by other code described in more detail in following paragraphs. The block operation may be an API call used for synchronizing execution between thread 310 and other code. In this instance, the execution of 310 will be resumed upon the occurrence of an interrupt for the device now being attached to. The block API call may result in a call to the kernel to place the wait thread 310 in a blocked execution state using scheduling primitives in the underlying operating system. As described elsewhere herein but not further illustrated for simplicity, the API may utilize the kernel helper module 220 when issuing the kernel mode call to place the wait thread 310 in a blocked state. After spawning the wait thread 310, the API 306 communicates with the kernel helper module 220 as illustrated by S2a to register with the operating system a generic ISR 320 in kernel mode as the ISR to be invoked upon the occurrence of an interrupt for the device. The module 220 then issues the attach request to the module 322 which results in registering the kernel mode generic ISR 320 to service any subsequent requests for the device. As will be seen in following figures and paragraphs, the generic ISR 320 may perform minimal work in connection with servicing the interrupt. The ISR 354 in the user mode device driver 304 will be invoked to perform processing to service the interrupt as described in FIG. 7.

Figure 7:
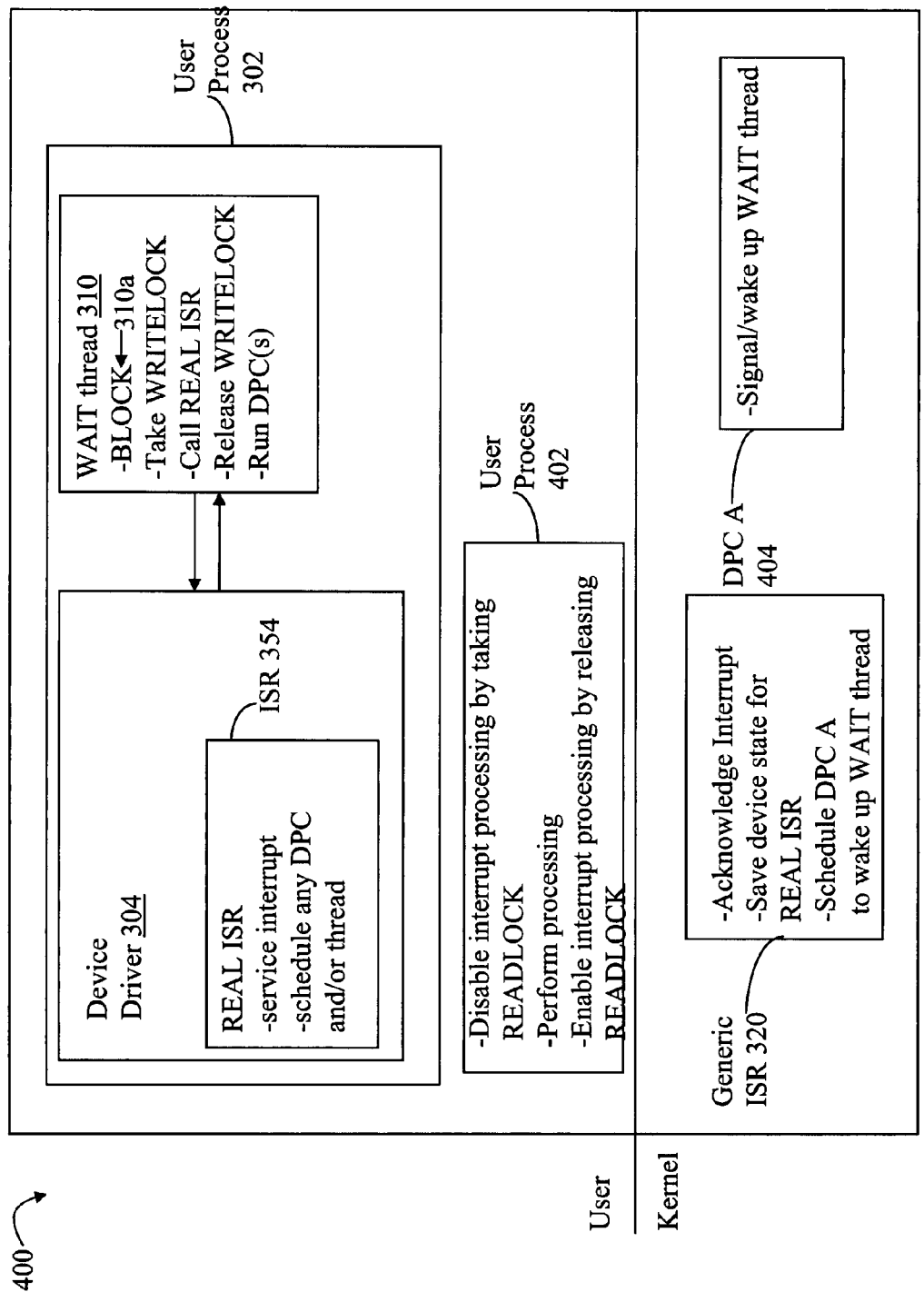

Referring now to FIG. 7, shown is an example illustrating processing upon the occurrence of an interrupt for the user mode device driver attached in FIG. 6. As a first step, the generic ISR 320 is invoked. The generic ISR 320 performs minimal processing needed so that the real ISR, ISR 354, is able to service the request. The generic ISR performs processing to acknowledge the interrupt. This may include setting particular registers on the device. The generic ISR may also save the device state information regarding the interrupt to be processed later by the real ISR, ISR 354. As will be appreciated by those skilled in the art, such device state information may be needed by the ISR 354 in servicing the interrupt. The device state information may include, for example, data in the device's hardware registers indicating a reason for the interrupt such as an error, successful completion of a previous request, device time out, and the like. The generic ISR 320 then schedules or queues a DPC, denoted as DPC A 404, to wake up the WAIT thread 310. The generic ISR 320 is written using API calls such as a DPC API call. At some point, the DPC A 404 executes and signals or wakes up thread 310. The signaling results in the wait thread being scheduled for execution by the processor. When the wait thread 310 resumes execution, it resumes execution following 310a, the point at which the wait thread's state was previously blocked. The wait thread 310 performs processing to invoke the real ISR, ISR 354, which services the interrupt. The wait thread 310 first uses a WRITELOCK synchronization operation. The WRITELOCK operation may be an API call which results in invoking the appropriate operating system primitives to implement a reader/writer lock. A reader/writer lock may have processes accessing the lock for read access or write access. Only a single process is allowed to access the lock for write providing exclusive access to the lock by the writer and not allowing any readers or other writers to access the lock. One or more processes may access the lock for read access when the lock is not already accessed for writing. A process cannot access the lock for write while there are any readers accessing the lock. A reader/writer lock may be a lock used to emulate enabling and disabling interrupts. When there are no readers accessing the lock, interrupts are enabled. When there are one or more readers accessing the lock, interrupts are disabled and the ISR 354 is not allowed to execute. Thus, the wait thread 310 does not invoke the ISR 354 until the WRITELOCK is available. Once the WRITELOCK is obtained, the real ISR code included in ISR 354 is invoked. The real ISR is the code that actually services the interrupt and then queues DPCs to complete the interrupt service processing, and/or otherwise has the DPC schedule threads to complete the processing. The ISR 354 may include an API call to perform the DPC operation and make the appropriate kernel mode calls using the underlying operating system primitives with the assistance of the kernel mode helper module (not illustrated in figure).

The reader/writer lock may be logically implemented using a reader counter and a writer counter. A reader is able to access the lock if the writer counter is 0. A writer is able to access the lock if the reader counter and writer counter are both 0. Each operation to "take" a READLOCK increases the reader counter by 1 if there are no writers and otherwise waits until there are no writers. Each operation to "release" a READLOCK decreases the reader counter by 1. Each operation to "take" a WRITELOCK increases the writer counter by 1 if there are no readers and other waits until there are no readers. Each operation to "release" a WRITELOCK decreases the writer counter by 1. The wait thread 310 may make API calls for the operations to take a WRITELOCK and release a WRITELOCK. The user process 402 may make API calls for the operations to "disable interrupt processing" and "enable interrupt processing". In implementing the "disable interrupt processing" for code executing in user mode, the API may take a READLOCK by using a reader/writer lock or other operating system primitive. In implementing the "enable interrupt processing" for code executing in user mode, the API may release a READLOCK by releasing the native reader/writer lock or other operating system primitive. The API may perform the processing needed to utilize the underlying operating system primitives and make appropriate calls into kernel space using the kernel mode helper module (not illustrated for simplicity). In one embodiment, the API may include calls to "disable interrupt processing" and "enable interrupt processing". Each of these may be published APIs for use by code modules. Within the API, there may be unpublished routines which implement the READLOCK and WRITELOCK operations. As such, a code module may include a first published API call to "disable interrupt processing" or "enable interrupt processing". The published API call may result in other unpublished API calls for taking or releasing a READLOCK as appropriate. Each of these unpublished API calls may utilize the underlying operating system primitives, such as a reader/writer lock or other primitive, that may vary with the underlying operating system. The wait thread 310 in this example may utilize other unpublished APIs for taking and releasing a WRITELOCK. Each of these unpublished API calls may also utilize the underlying operating system primitives, such as a reader/writer lock or other primitive, that may vary with the underlying operating system. The foregoing describes the behavior with respect to the API for user mode code. If code module 402, for example, is executed in kernel mode, the code module may include the same published API calls to "enable interrupt processing" and "disable interrupt processing". However the forgoing published API calls when made from code executing in the kernel mode may directly invoke the operating system or hardware primitives to directly manage enabling/disabling the interrupt state.

In one embodiment herein, the ISR 354 in user mode runs at a real-time priority level so that it is not pre-empted and is scheduled to execute prior to other user space code so that the ISR 354 executes with a priority substantially the same as the ISR 502 of FIGS. 4 and 5 and generic ISR 320. For the user space code in FIG. 7, the ISR 354 may have a higher priority than the emulated DPC call for user mode, and the emulated DPC may have a higher priority than other user processes, such as 402. In user mode, the API may implement the DPC functionality by scheduling a user mode thread for execution having a priority substantially the same as a DPC included in an operating system for kernel mode execution.

Once the real ISR code of ISR 354 completes, control is returned to the wait thread 310 which then issues an API call to run queued DPCs. The API call to run the DPCs in user mode causes execution of those DPCs associated with the same processor on which the wait thread 302 is currently executing. The last step of the wait thread 310 (e.g., to run the DPCs) causes the processor to execute the DPCs of the processor on which the wait thread is executing prior to other DPCs or other code having the same priority. This last step of the wait thread 310 may be optionally performed in an embodiment.

It should be noted that for the user space emulated DPC operation, whenever user space code performs a DPC call, this results in the API scheduling a DPC user-mode thread for execution on the same CPU as the requesting thread or code module. In other words, the emulated DPC operation queues a DPC thread for execution on the same CPU as the thread making the DPC call. The foregoing is made with reference to an embodiment in which there are multiple storage system processors so that the emulated DPC operation in user mode may result in scheduling a DPC user-mode thread with a relative priority as indicated above on any one of the data storage system processors. However, in one embodiment, the DPC thread is scheduled for execution on the same processor as that of the requestor or thread performing the DPC call.

It should be noted that the reader/writer lock is used to ensure that the ISR 354 and other code that may share the same data structures as the ISR 354 do not execute at the same time. In other words, the ISR 354 needs exclusive access to data structures used in connection with performing I/O operations for the device. For example, one of the data structures may be a buffer used to store data in connection with performing the I/O request for the device. Other threads may also be executing which utilize the same data structures. One or more of these other threads may be able to simultaneously access the data structures. Use of the reader/writer lock allows this to occur and also provide exclusivity to the ISR 354. To further illustrate, user process 402 may include code which accesses the same data structures as ISR 354. Prior to performing processing using these data structures, the process 402 may take a READLOCK to disable interrupt processing. If the wait thread 310 tries to take the WRITELOCK while 402 has a READLOCK, wait thread 310 will have to wait until 402 issues a release READLOCK indicating that there are no more readers.

It should be noted in the foregoing that each code portion in user mode and kernel mode may utilize APIs to implement the functionality described. The API may perform the necessary processing to implement the requested operation by invoking the helper modules as necessary and utilizing underlying primitives of the operating system.

Using the foregoing techniques with reference to FIGS. 4 and 5 with the device driver 506 in kernel mode, the attach API call results in ISR 502 being executed to service the interrupt. Using the foregoing techniques with reference to FIGS. 6 and 7 with the device driver 304 in user mode, the attach API call results in ISR 354 being executed to service the interrupt. With one modification, the same driver code illustrated may be executed in user mode or kernel mode. In this example, the generic ISR performs the required minimal processing to acknowledge the interrupt and allow subsequent processing to proceed. Generally, servicing an interrupt can be performed by code which is executed within the ISR, executed by a DPC, or code executed in a thread. When using the techniques herein with the device driver executing in user mode, the code which is typically executed within the ISR may be partitioned into two portions with a first small portion of processing performed within the generic ISR and the remaining portion performed by the REAL ISR (ISR 354). In implementation, it may be necessary to have the generic ISR acknowledge the interrupt immediately from kernel mode. In one embodiment, any coding difference between the ISR 354 when executing in user mode as in FIG. 7 and having the same ISR execute in kernel mode as illustrated by ISR 502 of FIG. 5 may be handled, for example, using compilation conditionals. In other words, the code portion of the ISR for acknowledging the interrupt and saving the device state may be conditionally included when the driver is executed in kernel mode.

Figure 7A:
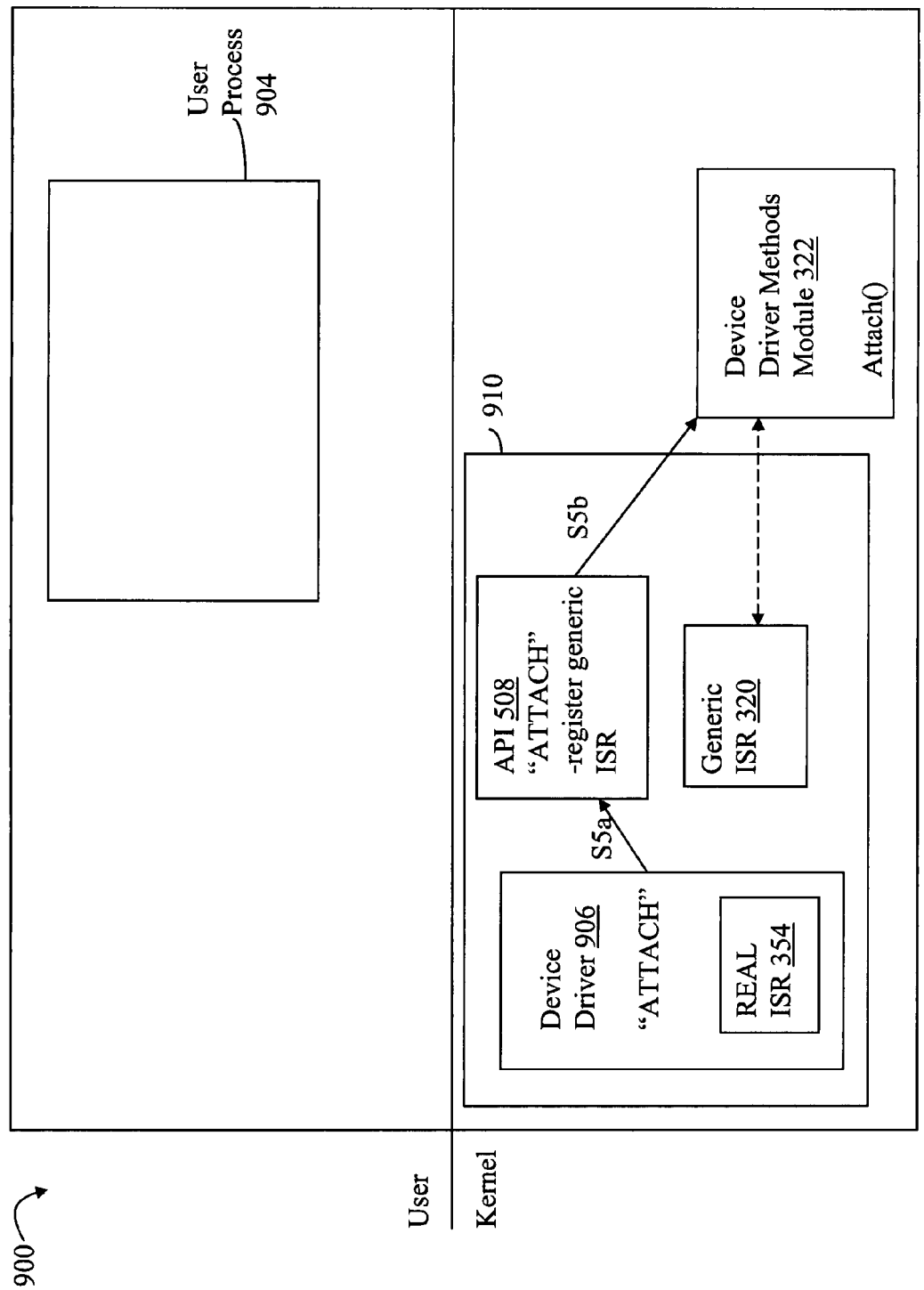
FIGS. 7A-7B illustrate an alternative technique for use with a kernel space device driver.
Figure 7B:
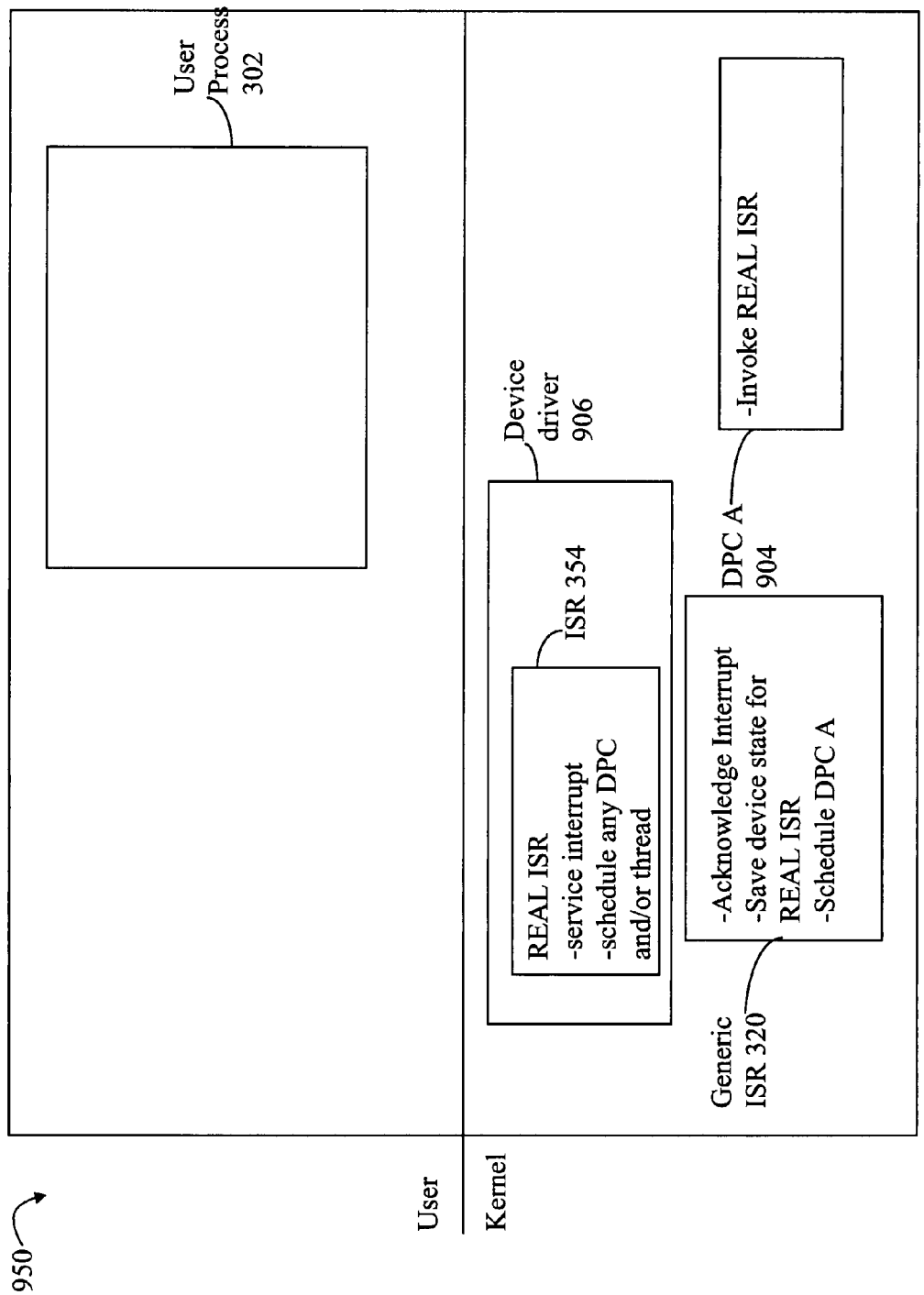

As an alternative to the conditional compilation and to using the techniques illustrated in FIGS. 4 and 5 when executing the device driver in kernel mode, an embodiment may register or attach the generic ISR 320 of FIG. 6. Upon the occurrence of an interrupt, the generic ISR may perform processing as described in connection with FIG. 7 with the modification that the queued DPC will invoke the real ISR for execution in kernel mode rather than a wait thread as in connection with user mode. FIGS. 7A and 7B illustrate this in more detail in connection with the alternative embodiment for kernel mode device driver execution using the same generic ISR and real ISR code for both user and kernel mode.

Referring to FIG. 7A, shown is an example of an alternative embodiment that may be used in connection with a device driver executing in kernel mode. In this example, the device driver 906 may include the real ISR code 354 as described previously in connection with FIG. 7. As a first step, an attach API call may be performed as indicated by S5a to attach as illustrated by S5b the generic ISR 320. The generic ISR 320 may be as described in connection with FIG. 7. With reference to FIG. 7B, at some point later in time, an interrupt occurs. In response to the occurrence of the interrupt, the generic ISR 320 is invoked which executes and queues a DPC A 904 for execution. The DPC 904 invokes the real ISR, ISR 354, of the device driver module 910. The ISR 354 may be as described in connection with FIG. 7.

In connection with the embodiment illustrated in FIGS. 7A and 7B, the same device driver code including the ISR 354 may be used executed in both kernel and user mode. The generic ISR is used when the device driver executes in user and kernel mode. When executing in user mode, additional code modules including the wait thread, and DPC to signal the wait thread may be used. When executing in kernel mode, a DPC may be used to invoke the ISR 354 rather than signal a wait thread since the wait thread is not used in connection with the kernel mode device driver execution.

Figure 8:
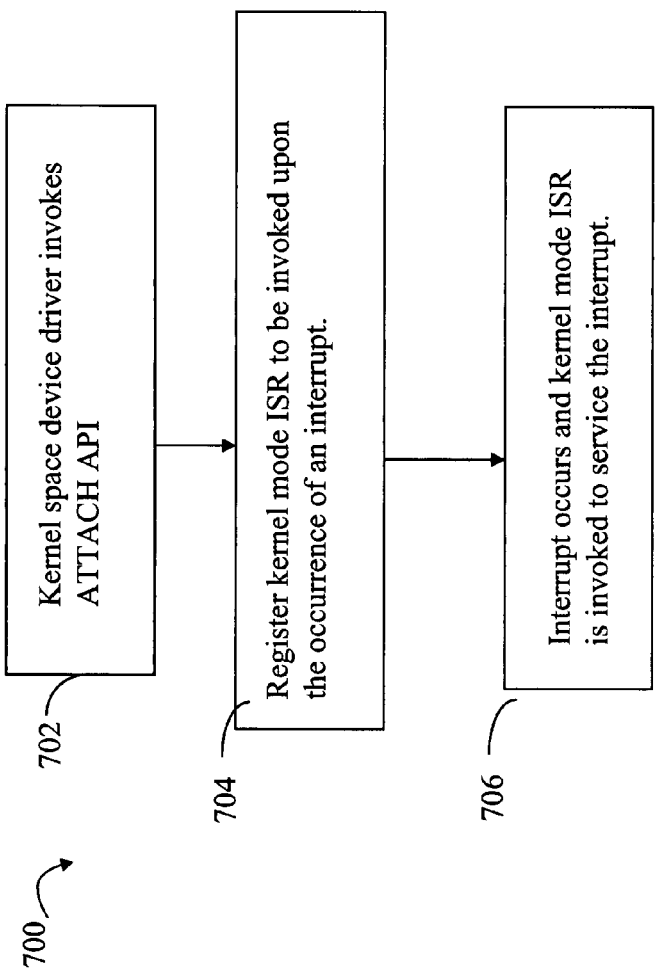
FIGS. 8 and 8A are flowcharts of processing steps that may be performed in an embodiment using the techniques herein for a kernel space device driver.

Referring now to FIG. 8, shown is a flowchart of processing steps performed in connection with the kernel mode device driver. The flowchart 700 summarizes processing described in connection with FIGS. 4 and 5. At step 702, the kernel mode driver invokes the attach API. At step 704, the attach API registers the kernel mode ISR to be invoked upon the occurrence of an interrupt for the device. At step 706, an interrupt occurs and the kernel mode ISR is invoked to service the interrupt.

Figure 8A:
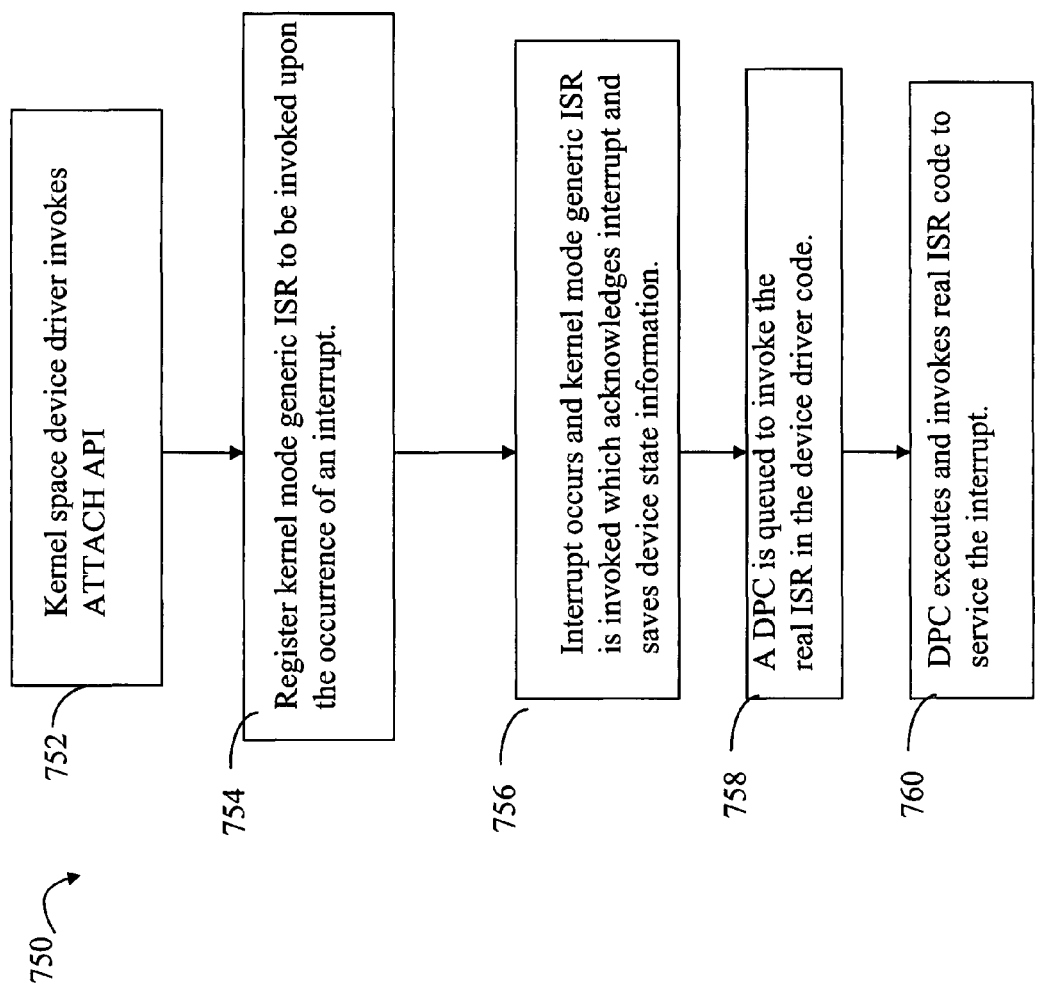

Referring now to FIG. 8A, shown is a flowchart of processing steps of an alternative embodiment of processing performed in connection with the kernel mode device driver. The flowchart 750 summarizes processing as described in connection with FIGS. 7A and 7B. At step 752, the kernel space device driver invokes the attach API. The attach API results in registering a step 754 the kernel mode generic ISR to be invoked upon the occurrence of an interrupt. At step 756, an interrupt occurs and the kernel mode generic ISR is invoked which acknowledges the interrupt and saves device state information. At step 758, a DPC is queued to invoke the real ISR in the device driver code. At step 760, the DPC queued in step 760 executes and invokes the real ISR code in the device driver to service the interrupt. The steps of 750 may be performed as an alternative to processing of FIG. 8.

Figure 9:
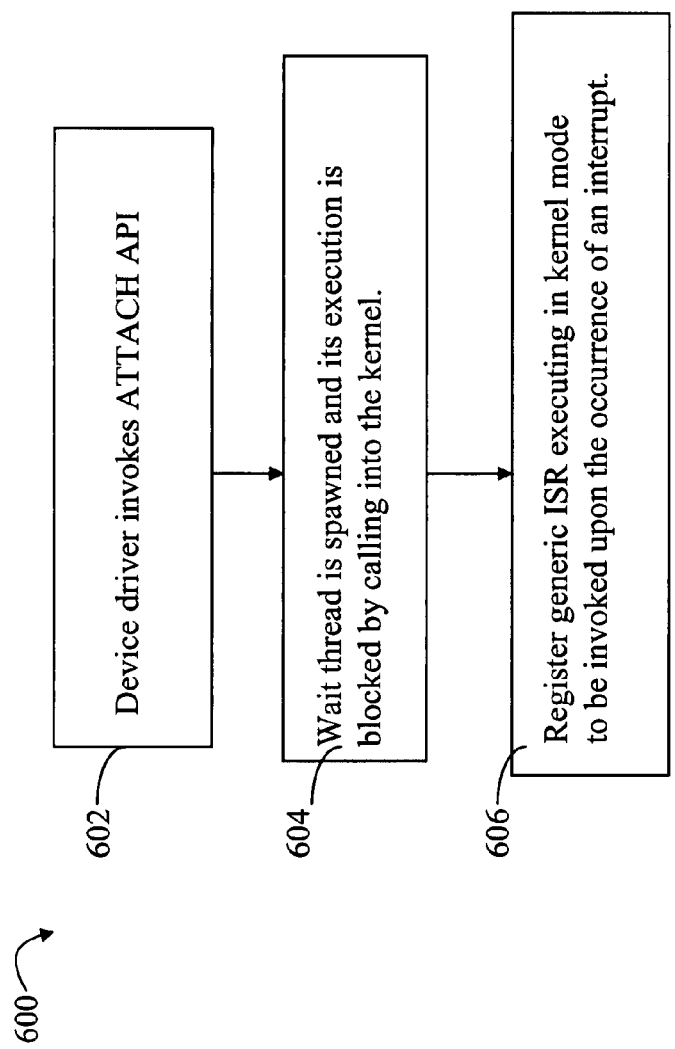
FIGS. 9-10 are flowcharts of processing steps that may be performed in an embodiment using the techniques herein with a user space device driver.

Referring now to FIG. 9, shown is a flowchart of processing steps performed in connection with the user mode device driver to register the generic ISR. The flowchart 600 summarized processing described connection with FIG. 6. At step 602, the user mode device driver invokes the attach API. At step 604, the wait thread is spawned and blocked by calling in to the kernel to block execution of the wait thread. At step 606, the generic ISR in the kernel mode is registered for the device to be invoked upon the occurrence of an interrupt for the device.

Figure 10:
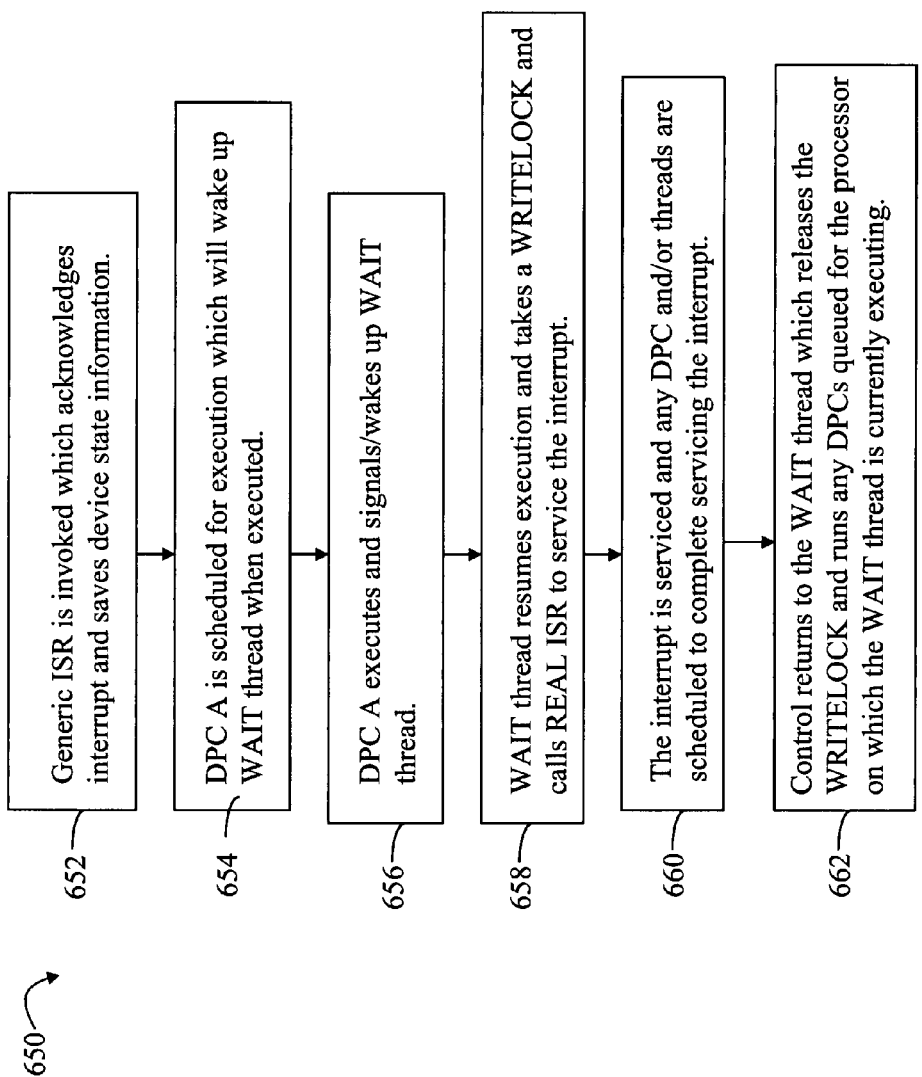

Referring now to FIG. 10, shown is a flowchart of processing steps performed in connection with the user mode device driver upon the occurrence of a device interrupt. The flowchart 650 summarized processing described connection with FIG. 7. At step 652, the generic ISR is invoked which acknowledges the interrupt and saves device state information. At step 654, a DPC is queued for execution which will wake up the user mode wait thread when executed. At step 656, the DPC executes and signals or wakes up the wait thread to resume execution. At step 658, the wait thread resumes execution and takes a WRITELOCK. The wait thread then invokes the real ISR to service the interrupt. At step 660, the interrupt is serviced by the real ISR in user mode and the real ISR may queue any DPCs to perform additional processing to service the interrupt, or may queue a DPC to schedule a thread for execution to complete servicing the interrupt. At step 662, control returns to the wait thread which releases the WRITELOCK and may run any DPCs queued for the processor on which the wait thread is currently executing.

Figure 11:
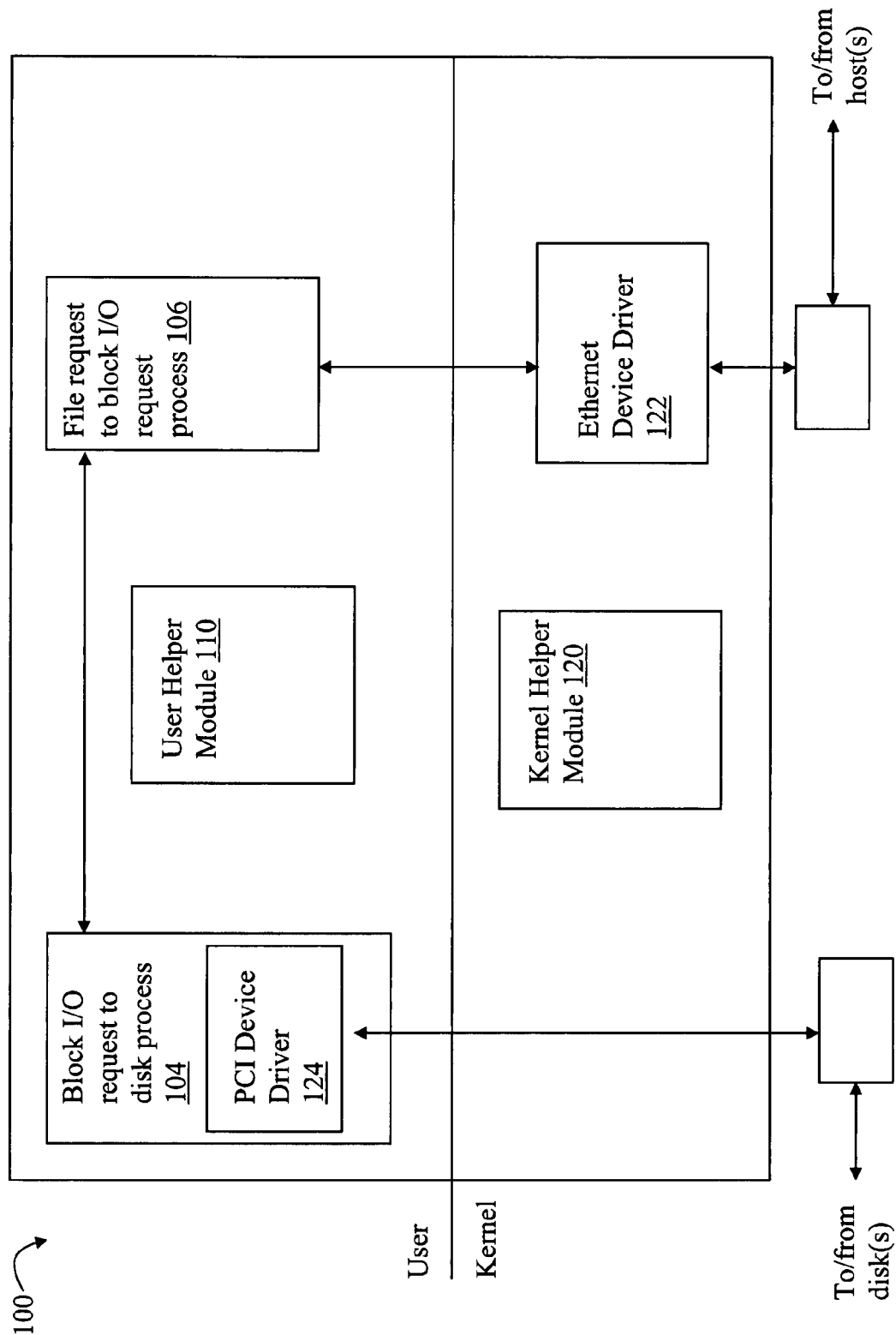
FIG. 11 is an example of components that may be included on the data storage system for use in performing the techniques herein.

Referring now to FIG. 11, shown is an example 100 of components that may be included on a data storage system using the techniques herein. The example 100 includes user processes 104 and 106. The PCI device driver 124 may be implemented as a user mode device driver using techniques herein. The PCI device driver 124 may facilitate communications with the disks. The example 100 also includes an Ethernet device driver executing in kernel mode to facilitate communications with one or more hosts or servers. The example 100 also includes helper modules 110 and 120 as described elsewhere in connection with techniques herein. Each of the processes 104 and 106 and module 122 may utilize the same API as described herein. The device driver 122 may receive a file system request from a host. The hosts may utilize any one of a variety of different files systems such as, for example NFS (Network File System) or CIFS (Common Internet File System). The process 106 may receive the file system request from the device driver 122 and form one or more block I/O requests. The process 106 may communicate the block I/O requests to the process 104. The user process 104 may take a block I/O request and communicate with the appropriate device to service the request. The process 104 may return data obtained from the device, such as in connection with a read request, to the user process 106 which then further communicates with the device driver 122 to return any data to the host. The example 100 illustrates what may be executing on a single data storage system processor of a multiprocessor data storage system using a dedicated single processor. Alternatively, the components of FIG. 11 may be scheduled to run on different processors of the data storage system. The particular one of the processors selected at a point in time may vary with the processor selected from the pool of data storage system processors. For example, an embodiment may schedule a code module for execution on the next available processor selected from the pool of data storage system processors.

An embodiment may also include multiple instances of 104 and 106 as described elsewhere herein. If process 104 fails such as due to failure of device driver 124, other instances of 104 and 106 and the operating system of the data storage system remain running. Other instances of 104 and 106 are affected only to the extent they are utilizing services of the failed process 104. For example, process 104 may be processing a request for process 106. However, the connection between 104 and 106 can be terminated and reestablished when the failed process 104 is restarted. Upon the failure of process 104, any necessary cleanup may be performed. For example, any resources consumed by 104 may be deallocated and then process 104 may be restarted. Failures of 106 may have affects similar to those as described above for 104 with respect to the operating system and other processes.

An embodiment may utilize a data storage system, such as the CLARiiON™ data storage system from EMC Corporation, which has multiple processing nodes. Each node may have its own data storage system processor as well as other components. In such an embodiment, each node may have executing thereon separate instances of the modules included in the example 100. As a variation to the foregoing, an embodiment may have zero or more instances of each of the modules 104 and 106 executing on each node so that collectively, across all the nodes of the data storage system, there is at least one instance of module 104 and at least one instance of module 106. To further illustrate as an example, a first node may have executing thereon all modules of the example 100 except for module 106. One or more instances of module 104 may reside on the first node. A second node may have executing thereon all modules of the example 100 except for module 104. One or more instances of module 106 may reside on the second node. As another example, each of the first and second nodes may have multiple instances of both modules 104 and 106 so that either node experiences a failure or is otherwise offline, the remaining node may handle the processing of the failed node.

It should be noted that upon the failure of one of the user processes, a new user process may be instantiated dynamically to assume the identity and processing of the failed process.

Figure 12:
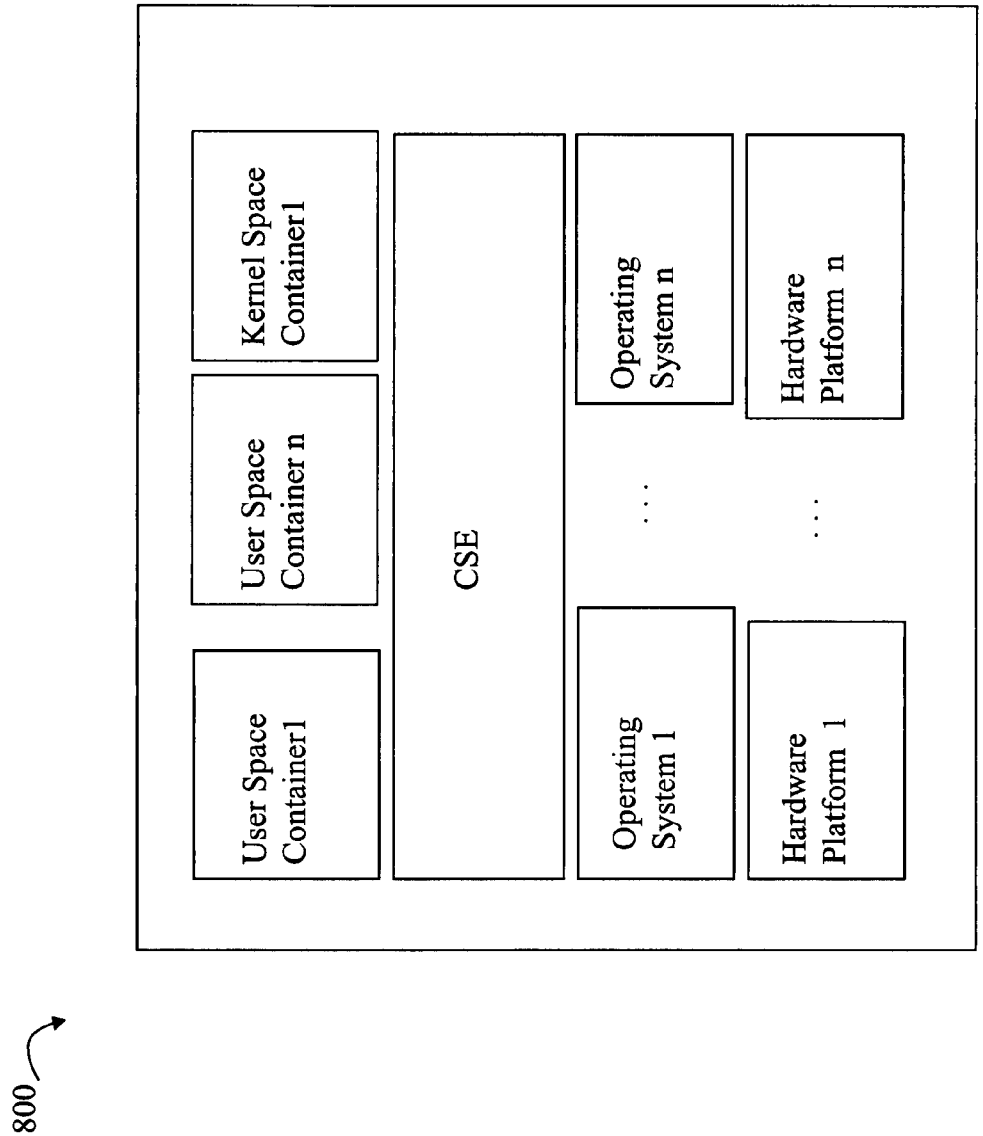
FIG. 12 is an illustration of the different operating systems and hardware platforms that may be included on a data storage system for use with the techniques herein.

Referring now to FIG. 12, shown is a representation illustrating the relationship of the common software environment (CSE) components to other components of the data storage system. In the example 800, the CSE includes the API, helper modules, and other infrastructure code, such as module 322, used to interface code of the API to other operating system components. The CSE may isolate any code in user space or kernel space above the CSE from dependencies in the operating system or hardware platform. Furthermore, code writing using the API of the CSE may be executed in either user or kernel mode as illustrated herein.

As will be appreciated by those skilled in the art, the techniques herein may be used for existing code as well as newly developed code. For existing code, the platform specific calls may be determined and replaced with appropriate API calls. The API code may be modified to provided the necessary support for any additional platform. Similarly, new code may be developed using the API calls which may utilize the platform specific primitives while isolating the code from these platform dependencies.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A data storage system having common software environment, the data storage system comprising:
    a computer system including a processor and having a user space and a kernel space;
    a first and second user process logic operating in the user space;
    peripheral component interconnect (PCI) device driver logic, wherein the PCI device driver logic operates in the first user process logic within the user space and communicates with the first user process logic;
    an Ethernet device driver logic communicating with the second user process logic, the Ethernet device driver logic operating in the kernel space, wherein the Ethernet device driver facilitates communications with a host;
    an application programming interface (API), wherein the API provides support for communication between the PCI device driver logic operating in the first user process logic, the second user process logic and the Ethernet device driver;
    a first and second helper module, wherein the first helper module operates in the user space, wherein the second helper module operates in the kernel space and wherein the communication between the PCI device driver logic operating in the first user process logic, the second user process logic and the Ethernet device driver is facilitated by the first and second helper modules; and
    wherein the Ethernet device driver logic receiving a file system request from the host, the file system request being communicated from kernel space to the first user process logic operating in the user space, the first user process logic forming a block input/output (I/O) request in response to the file system request.

2. The data storage system of claim 1, wherein the host comprises an network file system (NFS) file system.

3. The data storage system of claim 1, wherein the host comprises a common internet file system (CIFS).

4. The data storage system of claim 1, wherein the second user process logic receives data in response to the block I/O request.

5. The data storage system of claim 1, wherein the first user process logic communicates with the Ethernet device driver logic to return data to the host.

6. The data storage system of claim 1, wherein the second user process logic receives data in response to the block I/O request.

7. The data storage system of claim 1, wherein the second user process logic receives data in response to the block I/O request, the second user process logic communicates with the first user process logic, and the first user process logic communicates with the Ethernet device driver logic to return data to the host.

8. The data storage system of claim 1, further comprising:
    a service processor, wherein the first and second user process logic operate on the service processor.

9. The data storage system of claim 1, further comprising third user process logic, the third user process logic being another instance of the first user process logic.

10. The data storage system of claim 1, further comprising third user process logic, the third user process logic being another instance of the second user process logic.

11. The data storage system of claim 1, further comprising third and fourth user process logic, the third user process logic being another instance of the first user process logic, the fourth user process logic being another instance of the second user process logic.

12. The data storage system of claim 1, further comprising an operating system operating on the computer systems, and a third user process logic, the third user process logic being another instance of the first user process logic, wherein if the first user process logic fails, the operating system continues to operate and the third user process logic continues to operate.

13. The data storage system of claim 1, wherein if the first user process logic fails, and the first user process logic is subsequently restarted, communication between the first user process and the second user process is reestablished.

14. The data storage system of claim 1, wherein if the first user process logic fails, resources consumed by the first user process logic are deallocated.

15. The data storage system of claim 1, wherein if the first user process logic fails, a third user process logic is instantiated dynamically to assume the identity and processing of the failed first user process logic.

* * * * *